US012676830B2

(12) United States Patent
Wang et al.

(10) Patent No.: US 12,676,830 B2
(45) Date of Patent: Jul. 7, 2026

(54) CONCURRENT SUPPORT OF MULTIPLE DOWNSTREAM PHYSICAL TETHERING LINKS VIA A VIRTUAL TUNNEL LINK

(71) Applicant: GOOGLE LLC, Mountain View, CA (US)

(72) Inventors: Hui Wang, Buffalo Grove, IL (US); Jayachandran Chinnakkannu, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/719,059

(22) PCT Filed: Dec. 12, 2022

(86) PCT No.: PCT/US2022/052549
§ 371 (c)(1),
(2) Date: Jun. 12, 2024

(87) PCT Pub. No.: WO2023/114138
PCT Pub. Date: Jun. 22, 2023

(65) Prior Publication Data
US 2025/0055830 A1      Feb. 13, 2025

Related U.S. Application Data

(60) Provisional application No. 63/288,798, filed on Dec. 13, 2021.

(51) Int. Cl.
*H04L 61/5007* (2022.01)
*H04W 76/12* (2018.01)
*H04W 84/12* (2009.01)

(52) U.S. Cl.
CPC ......... *H04L 61/5007* (2022.05); *H04W 76/12* (2018.02); *H04W 84/12* (2013.01)

(58) Field of Classification Search
CPC .... H04L 61/5007; H04W 76/12; H04W 84/12
(Continued)

(56) References Cited

U.S. PATENT DOCUMENTS

2003/0177384 A1* 9/2003 Jones ...................... H04L 67/02
726/12
2008/0117855 A1* 5/2008 Choi ...................... H04W 28/26
370/315
(Continued)

FOREIGN PATENT DOCUMENTS

CN          101778032 A      1/2009
WO      WO-2019042228 A1 * 3/2019   ............ H04W 88/04

OTHER PUBLICATIONS

International Preliminary Report on Patentability mailed Jun. 27, 2024 for International Application No. PCT/US2022/052549, 9 pages.

(Continued)

*Primary Examiner* — Ruolei Zong

(57) ABSTRACT

A client device communicates with a network via a host device as an intermediary through a virtual link technique in which an Internet Protocol (IP) tunnel is established between the client device and the host device, and a plurality of physical links between the host device and the client device are assigned or otherwise associated with the IP tunnel such that the IP tunnel acts as a single virtual link between the client device and the host device, with fixed IP addresses, but therein data can be communicated between the client device and the host device on different physical links according to routing policy that includes routing rules for routing data packets between the different physical links according to one or more parameters.

20 Claims, 4 Drawing Sheets

(58) Field of Classification Search
USPC .......................................................... 709/245
See application file for complete search history.

(56) References Cited

U.S. PATENT DOCUMENTS

| | | | |
|---|---|---|---|
| 2009/0037999 A1* | 2/2009 | Anderson ............. | H04W 28/16 |
| | | | 726/12 |
| 2015/0282040 A1 | 10/2015 | Daniel et al. | |
| 2016/0105838 A1 | 4/2016 | Wang et al. | |
| 2017/0005834 A1* | 1/2017 | Hinkle ................ | H04L 65/1016 |
| 2017/0034860 A1 | 2/2017 | Berggren et al. | |
| 2017/0272273 A1* | 9/2017 | Singla ................... | H04W 76/12 |
| 2017/0366473 A1* | 12/2017 | Park ...................... | H04W 76/12 |
| 2018/0006843 A1 | 1/2018 | Levin et al. | |
| 2018/0041613 A1* | 2/2018 | Lapidous ................ | H04L 25/14 |
| 2018/0098251 A1* | 4/2018 | Li ..................... | H04W 36/0016 |
| 2019/0026094 A1 | 1/2019 | Stammers et al. | |
| 2020/0186433 A1 | 6/2020 | Cui et al. | |
| 2022/0231950 A1* | 7/2022 | Ramaswamy ........ | H04L 45/123 |

OTHER PUBLICATIONS

International Search Report and Written Opinion mailed Mar. 3, 2023 for International Application No. PCT/US2022/052549, 14 pages.
Communication pursuant to Article 94(3) EPC mailed Mar. 23, 2026 for EP Application No. 22847460.7, 9 pages.

* cited by examiner

CONCURRENT SUPPORT OF MULTIPLE DOWNSTREAM PHYSICAL TETHERING LINKS VIA A VIRTUAL TUNNEL LINK

CROSS-REFERENCE TO RELATED APPLICATIONS

The present application is a U.S. National Stage Application under 35 U.S.C. § 371 of International Patent Application Serial No. PCT/US2022/052549, entitled "CONCURRENT SUPPORT OF MULTIPLE DOWNSTREAM PHYSICAL TETHERING LINKS VIA A VIRTUAL TUNNEL LINK" and filed on Dec. 12, 2022, which claims priority to U.S. Provisional Application No. 63/288,798, entitled "CONCURRENT SUPPORT OF MULTIPLE DOWNSTREAM PHYSICAL TETHERING LINKS VIA A VIRTUAL LINK" and filed on Dec. 13, 2021, the entireties of which are incorporated by reference herein.

BACKGROUND

Tethering is a technique that provides more extensive network connectivity to a first device through a second device. For example, the first device and the second device may be configured with hardware and software that allows the first device to establish a tethered connection as a wired or wireless physical link with the second device. The first device transmits data to the second device through the tethered connection. The second device relays the data received from the first device to the appropriate network destination using communication channels established by the second device with a network, such as a cellular network. When the second device receives data intended for the first device from the network destination, the second device forwards the data to the first device through the tethered connection. As such, tethering allows the first device to access a network's services using the second device's network connection.

BRIEF DESCRIPTION OF THE DRAWINGS

The present disclosure is understood, and its numerous features and advantages made apparent to those skilled in the art, by referencing the accompanying drawings. The use of the same reference symbols in different drawings indicates similar or identical items.

DETAILED DESCRIPTION

Figure 1:
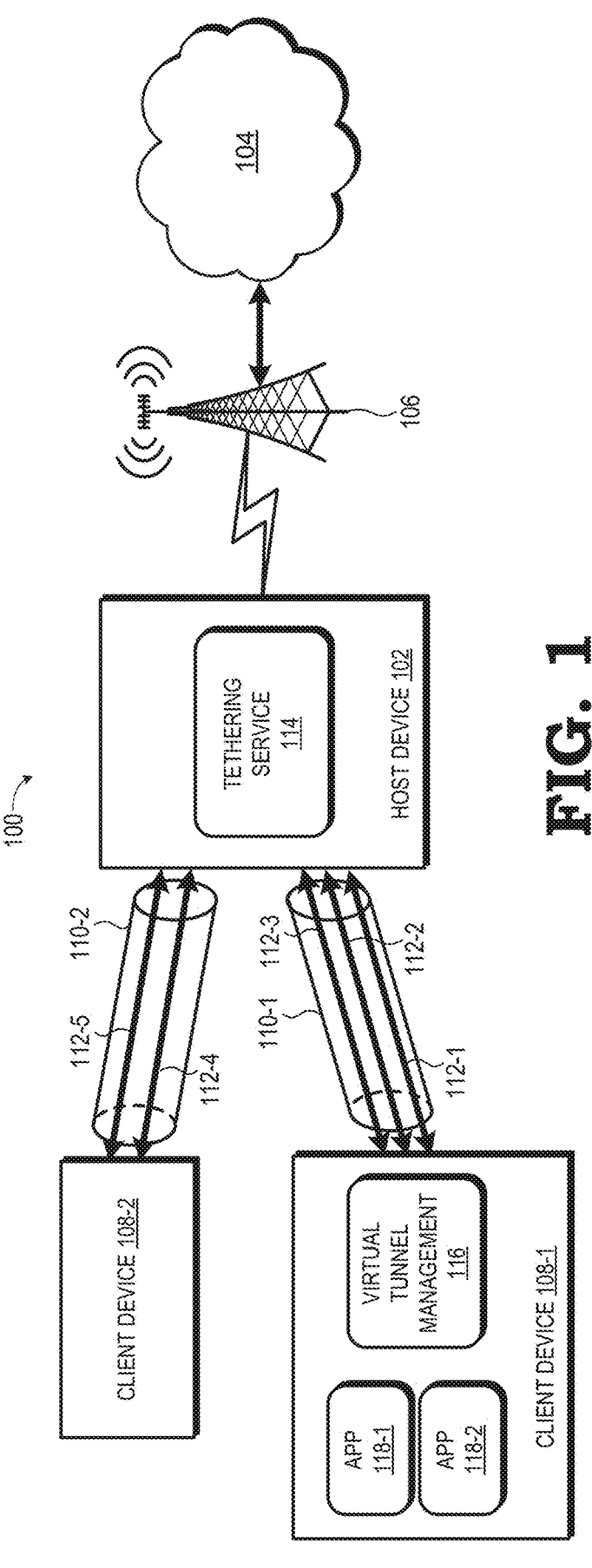
FIG. 1 is a block diagram of a system facilitating tethering between a client device and a host device via tunneling incorporating one or more physical links in accordance with some embodiments.

Tethering enables devices that may not have hardware or software resources for establishing a connection with a given network to still access the network through another capable device. For example, a client device, such as a smartwatch or tablet computer, may not have the hardware/software to connect with a cellular network. However, the client device can establish a wired or wireless tethered connection with a host device, such as a smartphone, capable of establishing a connection with the cellular network. The tethered connection enables the client device to access the cellular network's services through the host device's network connection.

When a tethered connection is made between devices, conventionally only one physical link is established between the host device (that is, the device with a connection with the network) and the client device (that is, the device utilizing the host device's network connection). However, the client device (also known as the "tethered device") may have multiple concurrent uses for the tethered connection, such as for providing downstream data streams with different expectations of quality of service (QOS), by utilizing different network slices for different applications (which in turn may provide various levels of QoS), and the like. For example, the client device may have two software applications concurrently running, one of which is for receiving and displaying a video stream and the other for conducting a Voice over Internet Protocol (VoIP) call. The video streaming application thus may benefit from a connection that provides high bandwidth, while the VoIP call application may benefit from a connection that provides low latency. However, it may not be practicable for a single physical link from the host device to provide both high bandwidth and low latency at the same time.

Accordingly, the present disclosure describes embodiments of systems and methods for providing a virtual link between a host device and a client device whereby the virtual link can represent multiple wired or wireless physical links between the host device and the client device. In at least one embodiment, when a client device tethers with a host device, the client device connects to the host device via a default physical link. The client device then uses this default physical link to establish an Internet Protocol (IP) tunnel with the host device. Thereafter, the IP tunnel acts as a virtual link between the client device and the host device such that as physical links between the client device and the host device are established or shut down, the physical links can be added or removed, respectively, from the IP tunnel, and the routing policy for the IP tunnel modified accordingly. In this manner, the client device can maintain the same IP address for the virtual link even as the physical link(s) associated with the virtual link change over time, and thereby rendering the physical link(s) used for communicating the data for a software application transparent to the software application such that the software application need only send or receive data from the "default" network; that is, the IP tunnel.

FIG. 1 illustrates a system 100 that utilizes concurrent support for multiple tethering links in accordance with some embodiments. The system 100 includes a host device 102 connected to a network 104 via a network edge device 106. One or more client devices 108 in turn are tethered to the host device 102. To illustrate, in an example cellular context, the host device 102 can include any of a variety of cellular user equipment (UE), such as a cellular phone, a cellular hot spot, a cellular-enabled vehicle entertainment system, and the like, and the client devices 108 can include any of a variety of devices, such as wearable devices (e.g., a smartwatch, headphones), other user equipment (e.g., a cellular phone), a non-cellular tablet computer, and the like, the cellular network 104 can comprise a core network and/or the Internet, and the network edge device 106 can comprise a base station, such as a 5G Node B (gNB), etc. As another illustration, in an example Wireless Fidelity (WiFi) example, the host device 102 and the client devices 108 may comprise the same or similar devices as noted above, while the network edge device 106 comprises a wireless access point (AP) and the network 104 includes a local area network (LAN), a wide area network (WAN), the Internet, or a combination thereof.

In at least one embodiment, each client device 108 accesses the network 104 via the host device 102 using tethering rather than via a direct connection between the network 104 and the client device 108. In conventional tethering approaches, a single direct connection, or "physi-cal link," is established between a client device and a host device. One or more software applications on the client device transmit data to the host device via this physical link (which may be wired or wireless) using a protocol stack that manages the interface between the software application and the physical link. The host device processes the transmission through its own protocol stack to obtain the transmitted data and then retransmits this data to a network via a connection between the host device and the network. Data transmitted from the network to the client device is processed in a similar way, except in reverse order. However, this approach is limited by the tying of the transmission of data between a service or other software application at the client device and the host device to a particular physical link, including the changing of Internet Protocol (IP) addresses when one physical link is eliminated and a new physical link brought up, as well as limiting the data transmission between the client device and host device to a particular link type that may not be best suited for the data being transmitted.

In contrast, the tethering approach employed between the client device 108 and the host device 102 employs a tun-neling protocol to establish a virtual link 110 between the client device 108 and the host device 102 (e.g., virtual link 110-1 for client device 108-1 and virtual link 110-2 for client device 108-2). Each virtual link 110 comprises an IP tunnel established between the corresponding client device 108 and the host device 102 using any of a variety of tunneling protocols, such as a Secure Socket Tunneling Protocol or an IP Security (IPSec) protocol. However, unlike a conven-tional use of an IP tunnel in which a tunnel establishes a connection between a first device and a third device via an intermediary second device, in implementations, the client device 108 and the host device 102 are directly connected via the corresponding virtual link 110 (that is, the tunnel implementing the virtual link 110 does not traverse an intermediary device). The virtual link 110 emulates a physi-cal link between the client device 108 and the host device 102 and thus may be assigned fixed source and destination IP addresses, as well as utilize other features typically provided by IP tunneling protocols, such as encryption, encapsulation, and the like. Moreover, rather than be limited to a single physical link 112, more than one physical link 112 between the client device 108 and the host device 102 can be incorporated into the virtual link 110, and the protocol stacks at the client device 108 and the host device 102 can allocate upstream or downstream traffic between the physi-cal links of the virtual link 110 according to a specified routing policy (see FIG. 2). For example, the virtual link 110-1 is an IP tunnel that represents three physical links 112-1, 112-2, and 112-3 between the client device 108-1 and the host device 102, while the virtual link 110-2 is an IP tunnel that represents two physical links 112-4 and 112-5 between the client device 108-2 and the host device 102. Each physical link 112 can include any of a variety of wired or wireless links established between the client device 108 and the host device 102, such as a Universal Serial Bus (USB) link, a Bluetooth™ wireless link or another wireless personal area network (WPAN) link, an IEEE 802.11 link or another wireless local area network (WLAN) link, a 5G NR cellular link, a 4G LTE cellular link, or another cellular link, and the like. As physical links are brought up or eliminated between the client device 108 and the host device 102, the physical links can be added to, or removed from, respec-tively, the corresponding virtual link 110 while maintaining the same IP addresses for the virtual link 110, with the routing policy (e.g., IP policy) that guides traffic onto a corresponding physical link updated as physical links 112 are added or eliminated.

To facilitate this direct tethering so as to virtualize one or more physical links 112 into a singular virtual link 110, the host device 102, in one embodiment, implements a tethering service module 114 (e.g., a set of one or more software modules executed by one or more processors) that supports the general tethering process between the host device 102 and the client devices 108. As a general overview, the tethering service module 114 operates to: authenticate client devices 108, or software applications on the client devices 108, as needed when they request, release, or switch physi-cal links 112; bring up, maintain, and tear down physical links 112 as needed;

coordinate with other modules of the host device 102, such as a network slicing control module or a QoS module (not shown), to trigger a corresponding client device 108 to switch physical downstream links 112 as needed; to establish, maintain, and release the IP tunnel with a corresponding client device 108 that serves as the virtual link 110; and to manage and apply routing policy for routing data traffic to the different physical link(s) 112 of the IP tunnel as needed. The tethering service module 114 further operates as an interface with the network edge device 106 to transmit data received from the virtual link 110 to the network 104 or to receive data from the network 104 for transmission to the client device 108 via the virtual link 110.

The client device 108, in turn, implements a tunnel management module 116 (e.g., one or more software mod-ules executed by one or more processors) that operates to coordinate with the tethering service module 114 to estab-lish, maintain, and release a corresponding IP tunnel for the virtual link 110 with the host device 102, as well as to manage and apply routing policy for routing data traffic to the different physical link(s) 112 of the IP tunnel as needed based on the routing rules as well as one or more QoS or network slicing parameters, or based on a source or desti-nation of the packets. The tunnel management module 116 further coordinates with one or more software applications 118 (e.g., software applications 118-1 and 118-2 of client device 108-1) to transmit data from the software applica-tions 118 to the host device 102 (and then the network 104) via the virtual link 110 as well as to supply data received from the network 104 via the host device 102 and the virtual link 110 to the software applications 118.

The use of direct tunneling between client device 108 and host device 102 and the ability to include more than one physical link 112 in a virtual link 110 (as well as to dynamically add or remove physical links from a virtual link 110) allows the client device 108 and the host device 102 to maintain a constant "link" with fixed IP addressing while also having the flexibility to allocate, and re-allocate, data transmissions among the underlying physical links 112 according to IP policy or other routing policy using the same constant "link" from the perspective of the software applications 118 of the client device 108. For example, software application 118-1 may be a voice call application and thus IP policy may dictate that data traffic to and from the software application 118-1 over the virtual link 110 be conducted over a low-latency physical link 112, whereas software application 118-2 may be a video streaming application and thus IP policy may dictate that data traffic to the software application 118 over the virtual link 110 be conducted over a high-bandwidth physical link 112. However, because both physical links 112 are represented by the IP tunnel representing virtual link 110, this specific physical link routing is opaque to the software applications 118, and thus a different low-latency physical link 112 may be swapped in for the original low-latency physical link 112 or a different high-bandwidth physical link 112 may be swapped in for the original high-bandwidth physical link 112, without interruption to, or involvement of, the software applications 118.

Figure 2:
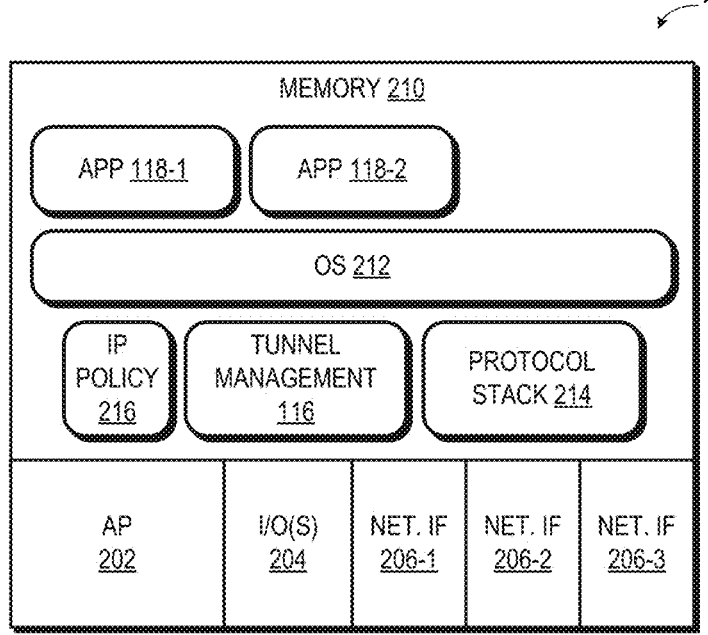
FIG. 2 is a block diagram illustrating an implementation of the client device of FIG. 1 in accordance with some embodiments.

FIG. 2 illustrates an example implementation of the client device 108 of the system 100 of FIG. 1 in accordance with some embodiments. In implementations, the client device 108 includes at least one application processor 202, one or more input/output (I/O) devices 204 (e.g., keyboard, display, mouse, speaker, microphone, etc.), a plurality of network interfaces 206, and at least one memory 208 (e.g., system memory, a hard disc drive, etc.), as well as various other components well-known in the art, such as a battery, power management components, and the like. The plurality of network interfaces 206 can include any type and combination of network interfaces, including wired network interfaces, such as a USB interface, and/or wireless network interfaces, such as cellular network interfaces, WiFi network interfaces, Bluetooth™ network interfaces, and the like. Although the example implementation of FIG. 2 depicts the client device 108 as having three network interfaces 206-1, 206-2, and 206-3, the client device 108 can have any number of network interfaces 206.

The one or more memories 210 store various software modules representing sets of executable instructions that are executed by the at least one application processor 202 (and, in implementations, processors of some or all of the network interfaces 206) to manipulate the client device 108 to perform the various functions described herein. These software modules include, for example, the aforementioned user-level software applications 118 (e.g., software applications 118-1 and 118-2), the tunnel management module 116, an operating system (OS) 212, and a network protocol stack 214 (which may implement, in whole or in part, the tunnel management module 116 and may be implemented by, in whole or in part, the OS 212, associated drivers, and/or software of the network interfaces 206). As a general operational overview, the OS 212, network protocol stack 214, and tunnel management module 116 operate together as an interface between the software applications 118 and the network interfaces 206, with the OS 212 providing one or more application programming interfaces (APIs) or other interfaces with the network protocol stack 214, which provides communications protocol functionality between the OS 212 and the physical resources of the network interfaces 206, such as Presentation, Session, Transport, Network, and Data Link functionality (per the Open Systems Interconnection (OSI) model) or Telecommunications Protocol/IP (TCP/IP) model), and the tunnel management module 116 operating at, or coordinating with, one of more of these layers of the protocol stack 214 to provide the virtual-link-via-tunneling functionality described herein. Further, the one or more memories 210 can store one or more data structures representing a routing policy (IP policy 216) that defines various rules to be applied at one or more of the layers of the protocol stack 214 and by the tunnel management module 116 for data traversing the physical links 112 in the virtual link 110, including configuration information specifying rules for initiating and establishing a virtual link 110, rules for adding physical links 112 to or removing physical links 112 from the virtual link 110, rules and/or tables (e.g., IP rules/IP tables) for routing data from the software applications 118 to specific physical links 112 within the virtual link 110, and the like.

Figure 3:
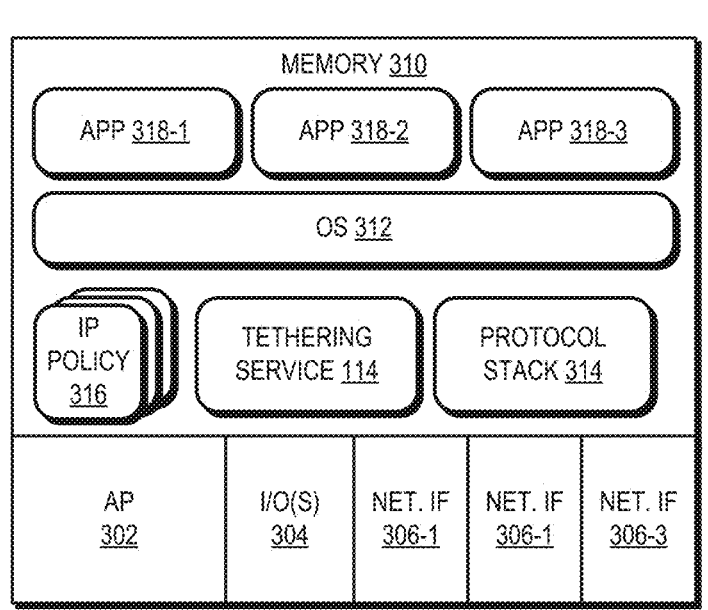
FIG. 3 is a block diagram illustrating an implementation of the host device of FIG. 1 in accordance with some embodiments.

FIG. 3 illustrates an example implementation of the host device 102 of the system 100 of FIG. 1 in accordance with some embodiments. In implementations, the host device 102 includes at least one application processor 302, one or more I/O devices 304, a plurality of network interfaces 306, and at least one memory 308 (e.g., system memory, a hard disc drive, etc.), as well as various other components well-known in the art. The plurality of network interfaces 306 can include any type and combination of network interfaces, including wired network interfaces and/or wireless network interfaces. Moreover, although the example implementation of FIG. 3 depicts the host device 102 as having three network interfaces 306-1, 306-2, and 306-3, the host device 102 can have any number of network interfaces 306.

Figure 4:
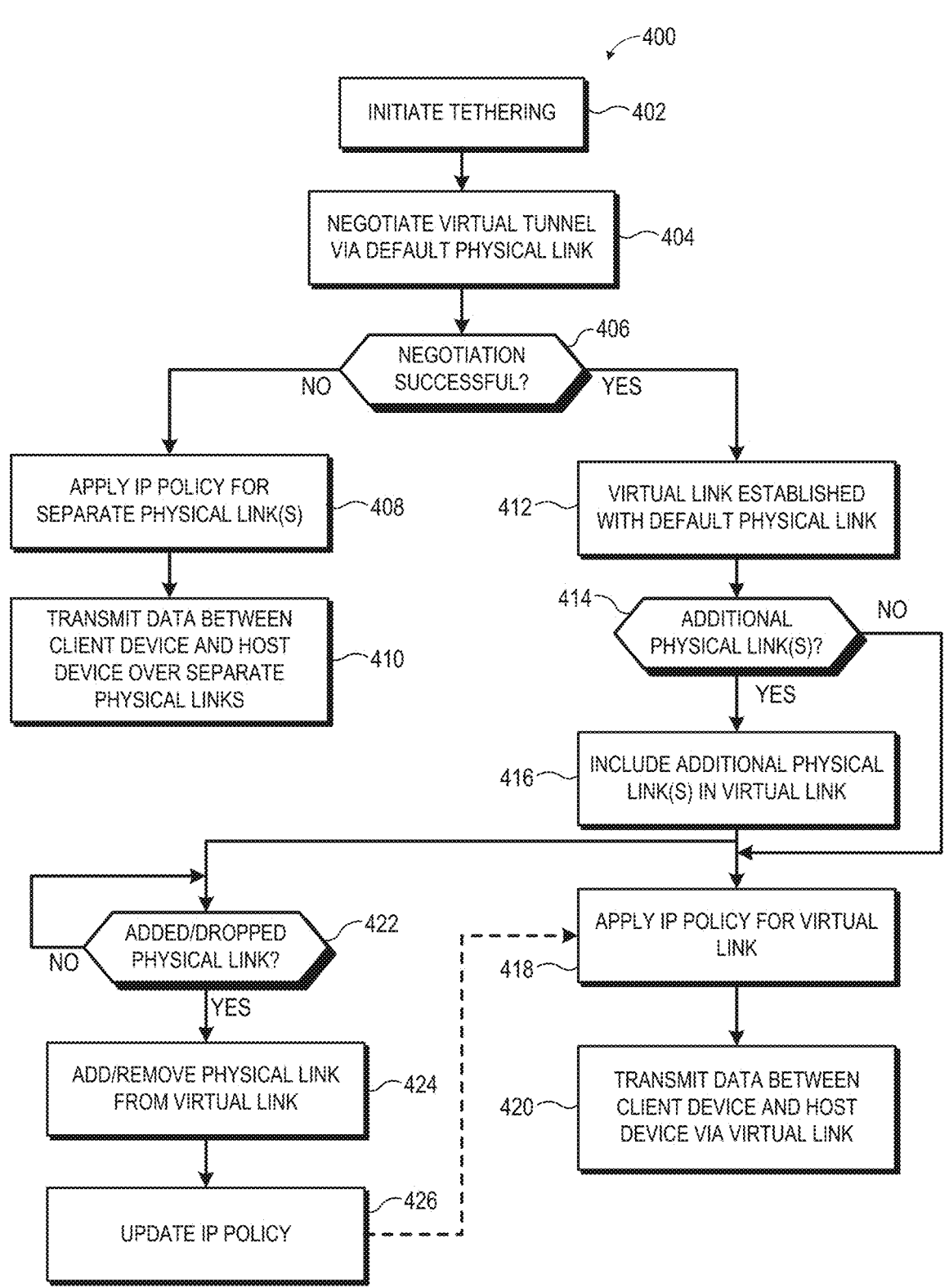
FIG. 4 is a flow diagram illustrating a method for tethering between a client device and a host device via tunneling incorporating one or more physical links in accordance with some embodiments.

The one or more memories 310 store various software modules representing sets of executable instructions that are executed by the at least one application processor 302 (and, in implementations, processors of some or all of the network interfaces 306) to manipulate the host device 102 to perform the various functions described herein. These software modules include, for example, user-level software applications 318 (e.g., software applications 318-1, 318-2, and 318-3), the tethering service module 114, an OS 312, and a network protocol stack 314 (which may implement, in whole or in part, the tethering service module 114 and may be implemented by, in whole or in part, the OS 312, associated drivers, and/or software of the network interfaces 306). As a general operational overview, the OS 312, network protocol stack 314, and tethering service module 114 operate together as an interface between the software applications 318 and the network interfaces 306, with the OS 312 providing one or more APIs or other interfaces with the network protocol stack 314, which provides communications protocol functionality between the OS 312 and the physical resources of the network interfaces 306, as similarly described above with respect to the network protocol stack 214, and the tethering service module 114 operating at, or coordinating with, one or more of these layers of the protocol stack 314 to provide the virtual-link-via-tunneling functionality described herein. Moreover, the one or more memories 310 can store, for each client device 108, one or more data structures representing a corresponding routing policy (IP policy 316) that is a counterpart to the routing policy (IP policy 216) of the client device 108 and including configuration information specifying rules for initiating and establishing a virtual link 110, rules for adding physical links 112 to or removing physical links from the virtual link 110, rules for routing data from the software applications 318 to specific physical links 112 within the virtual link 110, and the like FIG. 4 illustrates a method 400 of operation of the system 100 in establishing, maintaining, and modifying a virtual link 110 having one or more physical links 112 between the client device 108-1 and the host device 102 in accordance with some embodiments. To facilitate understanding, examples of certain sub-processes of method 400 are further illustrated with reference to FIG. 5. At block 402, tethering between the client device 108-1 and the host device 102 is initiated. The tethering process can be initiated by either device 102, 108-1 and may be initiated manually by a user of one of the devices or automatically, such as in response to one device detecting the presence of the other device. As part of the tethering process, a physical link 112 is established between the client device 108-1 and the host device 102. For example, the client device 108-1 may be a smartwatch that is configured to connect to a user's smartphone (the host device 102) via a Bluetooth™ wireless connection (a physical link 112) either automatically or in response to user input. This initial physical link 112 serves as the "default" physical link for the process described below. For purposes of illustration, the following assumes that a default physical link 112 is established between the network interface 206-1 of the client device 108-1 and the network interface 306-1 of the host device 102.

Figure 5:
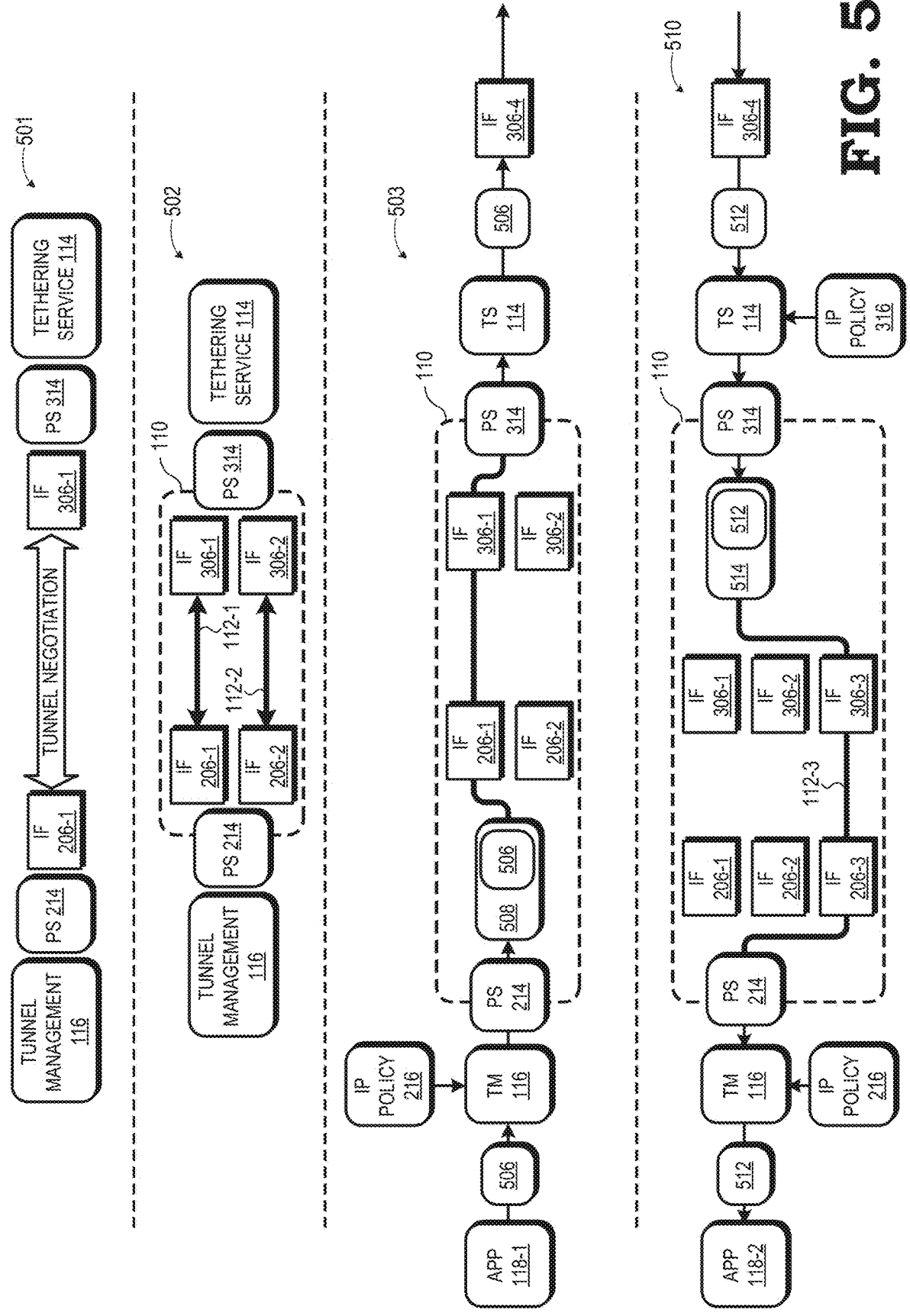
FIG. 5 is a set of diagrams illustrating various examples of subprocesses of the method of FIG. 4 in accordance with some embodiments.

With the default physical link 112 established between the client device 108-1 and the host device 102, at block 404 the tunnel management module 116 and protocol stack 214 of the client device 108-1 and the tethering service module 114 and protocol stack 314 of the host device 102 initiate a negotiation process via the default physical link 112 (see view 501, FIG. 5). For example, when the client device 108-1 is paired to the host device 102 via a Bluetooth™ wireless link (one example of a physical link 112), a user interface at either the host device 102 or the client device 108-1 may present the user with the option to establish a virtual link between the devices. Alternatively, the tethering service module 114 and/or the tunnel management module 116 may automatically attempt to negotiate the establishment of a tunnel to use as a virtual link 110 as soon as the two devices are connected via an initial physical link 112. The tunnel negotiation process can utilize any of a variety of standard or proprietary tunneling protocols. For example, the tunnel negotiation can involve an attempt to establish a tunnel using the IPSec protocol or the SSTP protocol. Typically, a tunnel negotiation involves an exchange of messages regarding encryption and authentication, and an attempt to agree on a number of associated parameters, such as type of encryption to be employed, encryption key parameters, network address translation (NAT) traversal, and the like.

In the event that the tunnel negotiation is unsuccessful ("NO" at block 406), then an IP tunnel will not be established and thus the virtual link technique cannot be employed. Accordingly, the client device 108-1 and the host device 102 fall back to the default conventional approach of treating each physical link 112 as an individual and separate link with its own IP addressing and individual IP policy. As such, at block 408 the client device 108-1 and the host device 102 each apply IP policy for upstream and downstream data traffic on a physical link-by-link basis and at block 410 all data transmitted between the client device 108-1 and the host device 102 is transmitted over a particular physical link using this separate IP policy. For example, if there are two software applications 118 and two physical links 112 in the virtual link 110, then each software application 118 may be assigned a separate one of the two physical links 112 (based on, for example, best match between latency/bandwidth needs and link capabilities), and then IP rules and an IP table modified so that packets from the two software applications 118 are routed to their respective physical link 112 based on a user ID (UID) or process ID (PID) of the packet. As another example, a particular software application 118 may request transmission of its data via an identified network slice, and thus the physical link 112 supporting the identified network slice may be identified as the interface for routing packets to/from the software application 118 in the IP rules and IP tables of the routing policy.

Returning to block 406, if the tunnel negotiation is successful, then at block 412 an IP tunnel is established via the default physical link 112, and this IP tunnel then serves as the basis for a virtual link 110 between the two devices. During or after the tunnel negotiation process, the client device 108-1 and the host device 102 may have established one or more additional physical links 112. For example, the default physical link 112 may be a WiFi link, but shortly after establishing the WiFi link, the client device 108-1 and the host device 102 established an additional physical link 112 in the form of a Bluetooth™ link. Accordingly, at block 414 the tunnel management module 116 of the client device 108-1 and the tethering service module 114 of the host device 102 each determines whether there are any additional physical links 112. If so, then at block 416 the tunnel management module 116 of the client device 108-1 and the tethering service module 114 of the host device 102 coordinate to add the identified additional physical links 112 to the virtual link 110. For example, the IP policy at each device is updated to reflect the inclusion of each added physical link 112 to the virtual link 110 through the addition of one or more IP rule(s) and/or one or more IP table(s) for the added physical link 112. To illustrate, with the addition of a physical link 112, an IP rule can be created to route data packets received from, or destined for, a certain user ID (UID) or certain process ID (PID) be routed to the added physical link 112 as a result of a comparison of the needs of the software application associated with the UID/PID and the capabilities of the added physical link 112, and the IP table(s) dynamically updated accordingly. For example, view 502 of FIG. 5 illustrates an example in which a virtual link 110 is established between the client device 108-1 and the host device 102 and which includes a physical link 112-1 established via network interfaces 206-1 and 306-1 and a physical link 112-2 established via network interfaces 206-1 and 306-2.

With the virtual link 110 established, the software applications 118 of the client device 108-1 can begin transmitting data to, and receiving data from, the network 104 via the virtual link 110 to the host device 102. To do so, for each incoming or outgoing data, at block 418 the IP policy is applied to the data to determine its manner of transmission via the virtual link 110 (that is, what physical link 112 it to be used for transmitting the data between the client device 108-1 and the host device 102). For example, the physical link 112-1 may have characteristics that indicate it is well suited for low-latency transmissions, but not well suited for high-bandwidth transmissions, whereas the physical link 112-2 may have the opposite characteristics. Accordingly, the IP policy implemented at the host device 102 and the client device 108-1 may dictate that data requiring high-bandwidth be routed to the physical link 112-2 when received at an ingress of the virtual link 110, and the IP policy further may dictate that data requiring low-latency be routed to the physical link 112-1 when received at an ingress of the virtual link 110.

At block 420, the data is then transmitted according to the applied IP policy. Typically, in accordance with the tunneling protocol employed, the data to be transmitted is encapsulated in a larger packet (and may be encrypted) and assigned source and destination IP addresses associated with the IP tunnel that serves as the virtual link 110. Then, per the routing rules of the IP policy, the encapsulated packet is routed to the appropriate physical link 112 for transmission between the devices 102 and 108-1.

For upstream transmission, the data is sourced from a software application 118 or similar service of the client device 108-1, and the encapsulated packet is transmitted through the IP tunnel over the appropriate physical link 112 to the host device 102, whereupon the encapsulated packet is authenticated, decapsulated (and, when encrypted, decrypted), and then the protocol stack 314 of the host device 102 routes the resulting decapsulated data for re-encapsulation into another packet for transmission to the network 104 via a network interface 306 of the host device 102 that is connected to the network edge device 106. To illustrate with reference to view 503 of FIG. 5, assume software application 118-1 is transmitting a data packet 506 intended for a destination in the network 104. The tunnel management module 116 and the protocol stack 214 together operate to encapsulate the data packet 506 into a tunnel packet 508 with a source IP address of X.X.X.X associated with the virtual link 110 and a destination address of Y.Y.Y.Y associated with the virtual link 110. In this example, the data packet 506 is specified as needing low latency, and thus the IP policy 216 includes a rule that routes such packets to the physical link 112-1 when received at the virtual link 110. As such, the tunnel packet 508 is routed to the network interface 206-1 for transmission to the network interface 306-1 of the host device 102 via the physical link 112-1. At the host device 102, the protocol stack 314 and tethering service module 114 coordinate to decapsulate/decrypt the data packet 506 from the tunnel packet 508 and then forward the data packet 506 to another network interface 306-4 (not shown in FIG. 3) for forwarding to the network 104.

For downstream transmission, the data is received from the network 104 at the host device 102, whereupon the protocol stack 314 encapsulates the data into a tunnel packet with the source and destination IP addresses associated with the IP tunnel serving as the virtual link 110 and the tethering service module 114 routes the tunnel packet to the appropriate physical link 112 for transmission to the client device 108-1. At the client device 108-1, the encapsulated packet is then authenticated, decapsulated (and, when encrypted, decrypted), and then then the protocol stack 214 of the client device 108 routes the resulting decapsulated data to the destination software application 118 intended to receive the data packet. To illustrate with reference to view 510 of FIG. 5, assume a device on network 104 is transmitting a data packet 512 intended for the software application 118-2. Further assume that another physical link 112-3 between network interface 206-3 of the client device 108-1 and network interface 306-3 of the host device 102 has been added to the virtual link 110, with a high QoS level, and the IP policies 216 and 316 have been updated accordingly, using the process described below with reference to blocks 422-426. The tethering service module 114 and the protocol stack 314 together operate to encapsulate the data packet 512 into a tunnel packet 514 with a source IP address of Y.Y.Y.Y associated with the virtual link 110 and a destination address of X.X.X.X associated with the virtual link 110. In this example, the data packet 512 is specified as needing a certain QoS level that can be met by the QoS parameters of the physical link 112-3, and thus the IP policy 316 includes a rule that routes such packets to the physical link 112-3 when received at the virtual link 110. As such, the tunnel packet 514 is routed to the network interface 306-3 for transmission to the network interface 206-3 of the client device 108-1 via the physical link 112-3. At the client device 108-1, the protocol stack 214 and tunnel management module 116 coordinate to decapsulate/decrypt the data packet 512 from the tunnel packet 514 and then forward the data packet 512 to the software application 118-2 according to the IP policy 216.

As explained above, the virtual link 110 can represent one or more physical links 112, and may be dynamically updated to include, or remove, physical links 112 as new physical links 112 are instantiated or previous physical links 112 are torn down or otherwise eliminated. Accordingly, after the virtual link 110 is initially established, the tunnel management module 116 and the tethering service module 114 cooperate to monitor for the addition of new physical links 112 or the dropping of physical links 112 at block 422. In the event that a new physical link 112 has been established or a previously-established physical link 112 has been removed, then at block 424 the tunnel management module 116 and the tethering service module 114 cooperate to add the new physical link 112 or remove the discontinued physical link 112 from the virtual link 110, and at block 426 the IP policies 216 and 316 are updated to reflect the changes, such as by changing the IP routing rules to incorporate the new physical link 112 or to remove routing to the removed physical link 112. This updated IP policy then is used by the client device 108-1 and the host device 102 for future transmissions of data over the IP tunnel that serves as the virtual link in accordance with the processes of blocks 418 and 420 described above.

The apparatuses and processes of the present disclosure may be better understood after considering the following non-limiting examples, individually or in any combination:

Example 1: A method including establishing a plurality of physical links between a client device and a host device, establishing an Internet Protocol (IP) tunnel between the client device and the host device, the IP tunnel utilizing the plurality of physical links, and communicating data between the client device and a network connected to the host device via the IP tunnel in accordance with a routing policy that directs routing of data over the plurality of physical links.

Example 2: The method of Example 1, further including establishing an additional physical link between the client device and the host device, modifying the IP tunnel to include the additional physical link, and modifying the routing policy to reflect the additional physical link.

Example 3: The method of Example 1 or 2, further including eliminating a physical link between the client device and the host device, modifying the IP tunnel to remove the eliminated physical link, and modifying the routing policy to reflect the eliminated physical link.

Example 4: The method of Example 2 or 3, wherein establishing the IP tunnel includes assigning an IP address to the client device for the IP tunnel, and modifying the IP tunnel does not change the IP address assigned to the client device.

Example 5: The method of any of Examples 1 to 4, wherein communicating data between the client device and the network via the IP tunnel includes receiving a data packet at one end of the IP tunnel, determining at least one parameter of the data packet, encapsulating the data packet to create a tunnel packet, and routing the tunnel packet to a physical link selected from the plurality of physical links associated with the IP tunnel based on at least one routing rule that applies to the at least one parameter of the data packet.

Example 6: The method of Example 5, wherein the at least one parameter of the data packet includes a latency parameter, a bandwidth parameter, a quality-of-service parameter, a source of the data packet, or a destination of the data packet.

Example 7: The method of any of Examples 1 to 6, wherein the plurality of physical links includes wired links, wireless links, or a combination of at least one wired link and at least one wireless links.

Example 8: The method of Example 7, wherein a wireless link includes at least one of a cellular link, a wireless local area network (WLAN) link, or a wireless personal area network (WPAN) link.

Example 9: A client device configured to perform the method of any of Examples 1 to 8.

Example 10: A host device configured to perform the method of any of Examples 1 to 8.

Example 11: A method, at a host device, including establishing an Internet Protocol (IP) tunnel with a client device, the IP tunnel having a plurality of physical links between the host device and the client device, receiving a data packet from a network connected to the host device, encapsulating the data packet to generate a tunnel packet, and providing the tunnel packet to a physical link for transmission to the client device, the physical link selected from the plurality of physical links based on routing policy representing one or more routing rules for routing data packets over the plurality of physical links based on one or more parameters of the data packets.

Example 12: A method, at a client device, including establishing an Internet Protocol (IP) tunnel with a host device, the IP tunnel having a plurality of physical links between the host device and the client device, receiving a data packet from a software application of the client device, encapsulating the data packet to generate a tunnel packet, and providing the tunnel packet to a physical link for transmission to the host device, the physical link selected from the plurality of physical links based on routing policy representing routing rules for routing data packets over the plurality of physical links based on one or more parameters of the data packets.

Example 13: The method of Example 11 or 12, wherein the one or more parameters include a latency parameter, a bandwidth parameter, a quality-of-service parameter, a source of the data packets, or a destination of the data packets.

Example 14: The method of any of Examples 11 to 13, further including establishing an additional physical link between the client device and the host device, modifying the IP tunnel to include the additional physical link, and modifying the routing policy to reflect the additional physical link.

Example 15: The method of any of Examples 11 to 14, further including eliminating a physical link between the client device and the host device, modifying the IP tunnel to remove the eliminated physical link, and modifying the routing policy to reflect the eliminated physical link.

In some embodiments, certain aspects of the techniques described above may be implemented by one or more processors of a processing system executing software. The software comprises one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM) or other non-volatile memory device or devices, and the like. The executable instructions stored on the non-transitory computer-readable storage medium may be in source code, assembly language code, object code, or another instruction format that is interpreted or otherwise executable by one or more processors.

A computer-readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectro-mechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:

establishing a plurality of physical links between a client device and a host device, the plurality of physical links being independently establishable and removable;

establishing an Internet Protocol (IP) tunnel between the client device and the host device, the IP tunnel utilizing the plurality of physical links; and communicating data between the client device and a network connected to the host device via the IP tunnel in accordance with a routing policy that directs routing of data over the plurality of physical links.

2. The method of claim 1, further comprising:

establishing an additional physical link between the client device and the host device;

modifying the IP tunnel to include the additional physical link; and modifying the routing policy to reflect the additional physical link.

3. The method of claim 1, further comprising:

eliminating a physical link between the client device and the host device;

modifying the IP tunnel to remove the eliminated physical link; and modifying the routing policy to reflect the eliminated physical link.

4. The method of claim 2, wherein:

establishing the IP tunnel includes assigning an IP address to the client device for the IP tunnel; and modifying the IP tunnel does not change the IP address assigned to the client device.

5. The method of claim 1, wherein communicating data between the client device and the network via the IP tunnel comprises:

receiving a data packet at one end of the IP tunnel;

determining at least one parameter of the data packet;

encapsulating the data packet to create a tunnel packet; and routing the tunnel packet to a physical link selected from the plurality of physical links associated with the IP tunnel based on at least one routing rule that applies to the at least one parameter of the data packet.

6. The method of claim 5, wherein the at least one parameter of the data packet includes a latency parameter, a bandwidth parameter, a quality-of-service parameter, a source of the data packet, or a destination of the data packet.

7. The method of claim 1, wherein the plurality of physical links includes wired links, wireless links, or a combination of at least one wired link and at least one wireless link.

8. The method of claim 7, wherein a wireless link includes at least one of: a cellular link; a wireless local area network (WLAN) link; or a wireless personal area network (WPAN) link.

9. A client device comprising:

a plurality of network interfaces;

at least one processor coupled to the plurality of network interfaces; and memory coupled to the at least one processor and storing executable instructions that, when executed by the at least one processor, cause the client device to perform the method of claim 1.

10. A host device comprising:

a plurality of network interfaces;

at least one processor coupled to the plurality of network interfaces; and memory coupled to the at least one processor and storing executable instructions that, when executed by the at least one processor, cause the host device to perform the method of claim 1.

11. A method, at a host device, comprising:

establishing an Internet Protocol (IP) tunnel with a client device, the IP tunnel having a plurality of physical links between the host device and the client device, the plurality of physical links being independently establishable and removable;

receiving a data packet from a network connected to the host device;

encapsulating the data packet to generate a tunnel packet; and providing the tunnel packet to a physical link for transmission to the client device, the physical link selected from the plurality of physical links based on routing policy representing one or more routing rules for routing data packets over the plurality of physical links based on one or more parameters of the data packets.

12. A method, at a client device, comprising:

establishing an Internet Protocol (IP) tunnel with a host device, the IP tunnel having a plurality of physical links between the host device and the client device, the plurality of physical links being independently establishable and removable;

receiving a data packet from a software application of the client device;

encapsulating the data packet to generate a tunnel packet; and providing the tunnel packet to a physical link for transmission to the host device, the physical link selected from the plurality of physical links based on routing policy representing routing rules for routing data packets over the plurality of physical links based on one or more parameters of the data packets.

13. The method of claim 11, wherein the one or more parameters include a latency parameter, a bandwidth parameter, a quality-of-service parameter, a source of the data packets, or a destination of the data packets.

14. The method of claim 11, further comprising:

establishing an additional physical link between the client device and the host device;

modifying the IP tunnel to include the additional physical link; and modifying the routing policy to reflect the additional physical link.

15. The method of claim 11, further comprising:

eliminating a physical link between the client device and the host device;

modifying the IP tunnel to remove the eliminated physical link; and modifying the routing policy to reflect the eliminated physical link.

16. A client device comprising:

a plurality of network interfaces;

at least one processor coupled to the plurality of network interfaces; and at least one memory coupled to the at least one processor and storing executable instructions configured to cause the at least one processor and the plurality of network interfaces to:

establish an Internet Protocol (IP) tunnel with a host device, the IP tunnel having a plurality of physical links between the host device and the client device, the plurality of physical links being independently establishable and removable;

receive a data packet from a software application of the client device;

encapsulate the data packet to generate a tunnel packet; and provide the tunnel packet to a physical link for transmission to the host device, the physical link selected from the plurality of physical links based on routing policy representing routing rules for routing data packets over the plurality of physical links based on one or more parameters of the data packets.

17. The client device of claim 16, wherein the one or more parameters include a latency parameter, a bandwidth parameter, a quality-of-service parameter, a source of the data packets, or a destination of the data packets.

18. The client device of claim 16, wherein the executable instructions are further configured to cause the at least one processor and the plurality of network interfaces to:

establish an additional physical link between the client device and the host device;

modify the IP tunnel to include the additional physical link; and modify the routing policy to reflect the additional physical link.

19. The client device of claim 16, wherein the executable instructions are further configured to cause the at least one processor and the plurality of network interfaces to:

eliminate a physical link between the client device and the host device;

modify the IP tunnel to remove the eliminated physical link; and modify the routing policy to reflect the eliminated physical link.

20. A host device comprising:

a plurality of network interfaces;

at least one processor coupled to the plurality of network interfaces; and at least one memory coupled to the at least one processor and storing executable instructions configured to cause the at least one processor and the plurality of network interfaces to:

establish an Internet Protocol (IP) tunnel with a client device, the IP tunnel having a plurality of physical links between the host device and the client device, the plurality of physical links being independently establishable and removable;

receive a data packet from a network connected to the host device;

encapsulate the data packet to generate a tunnel packet; and provide the tunnel packet to a physical link for transmission to the client device, the physical link selected from the plurality of physical links based on routing policy representing one or more routing rules for routing data packets over the plurality of physical links based on one or more parameters of the data packets.

\* \* \* \* \*